(12) United States Patent
Helbig et al.

(10) Patent No.: US 6,317,506 B1
(45) Date of Patent: Nov. 13, 2001

(54) MEASURING THE CHARACTERISTICS OF OSCILLATING MOTION

(75) Inventors: Herbert F. Helbig; Daniel J. Burns, both of Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/292,659

(22) Filed: Apr. 15, 1999

(51) Int. Cl.$^7$ ............................................. G06K 9/00
(52) U.S. Cl. .................................................. 382/107
(58) Field of Search ........................... 382/100, 107, 382/141, 181, 206; 324/71.5, 76.11, 76.12, 76.13, 76.49, 750, 763, 765; 331/29, 116 R, 116 M, 154, 155, 156, 182; 702/113, 115; 73/1.79, 1.82, 579, 584, 618, 649, 865.9; 359/197, 201; 327/50, 72, 82, 90; 348/97, 98, 220, 352, 431.1

(56) References Cited

U.S. PATENT DOCUMENTS

| | | | |
|---|---|---|---|
| 4,978,222 | * 12/1990 | Drew et al. | 356/618 |
| 5,745,668 | * 4/1998 | Poggio et al. | 345/475 |
| 5,990,473 | * 11/1999 | Dickey et al. | 250/231.13 |
| 6,219,145 | * 4/2001 | Gutierrez et al. | 356/498 |

OTHER PUBLICATIONS

C.Q. Davis & D.M. Freeman, "Using a Light Microscope to Measure Motions with Nanometer Accuracy", Optical Engineering, vol. 37, No. 4, pp. 1299–1304, Apr. 1998.

C.Q. Davis & D.M. Freeman, "Statistics of Subpixel Registration Algorithms Based on Spatio–Temporal Gradients or Block Matching", Optical Engineering, vol. 37, No. 4, pp. 1290–1298, Apr. 1998.

(List continued on next page.)

*Primary Examiner*—Andrew W. Johns
*Assistant Examiner*—Shervin Nakhjavan
(74) *Attorney, Agent, or Firm*—Harold L. Burstyn; Joseph A. Mancini

(57) ABSTRACT

Apparatus and method to measure the characteristics of the substantially periodic motion of a mechanical system. A non-intrusive technique measures such motion by analyzing images of a movable component of the system without requiring a motion sensor built into the system. If the system includes a motion sensor, the present invention can calibrate it. The present invention applies to an object of any length scale if it can be imaged. The amplitude of a component's motion is obtained from a single, time-exposed image while the system is in periodic motion and a reference image made with the component at rest. The technique, implemented as one component of an automated test-bed apparatus, is significantly faster than the prior art. The present invention is especially efficient in characterizing the mechanical performance of MEMS. Speed facilitates both hands-on testing of prototypes and testing in production environments. Results from the present invention applied to a microfabricated resonator are compared with electrical measurements derived from an integrated comb-drive. Benchmark comparisons demonstrate that the present invention delivers comparable results in shorter times with simpler, less expensive apparatus than the prior art. The present invention removes any upper limit on the frequency of motions that can be analyzed.

25 Claims, 6 Drawing Sheets

OTHER PUBLICATIONS

J.S. Burdess, A.J. Harris, D. Wood, R.J. Pitcher, & D. Glennie, "A System for the Dynamic Chacterization of Microstructures", J. Microelectromech. Syst., vol. 6, pp. 322–328, 1997.

D.M. Freeman, A.J. Aranyosi, M.J. Gordon & S.S. Hong, "Multidimensional Motion Analysis of MEMS Using Computer Microvision", Digest, Solid State Sensor & Actuator Workshop, pp. 150–155, Hilton Head SC, 1998.

K.L. Turner, P.G. Hartwell, N.C. McDonald, "Multi–Dimensional MEMS Motion Chacterization Using Laser Vibrometry", personal conversation and preprint of a manuscript submitted to J. Microelectromeh. Syst.

W. Hemmert, M.S. Mermelstein, D.M. Freeman, "Nano–meter Resolution of Three Dimensional Motions Using Video Interference Microscopy", Dig. 12th IEEE International Conf on MEMS, pp. 302–308, Jan. 1999.

International Search Report, PCT/US 00/09898, International Search completed Aug. 10, 2000, 3 pages.

Notification of Transmittal of the International Preliminary Examination Report dated Feb. 16, 2001.

* cited by examiner

MEASURING THE CHARACTERISTICS OF OSCILLATING MOTION

STATEMENT OF GOVERNMENT INTEREST

The invention described herein may be manufactured and used by or for the Government for governmental purposes without the payment of any royalty thereon.

BACKGROUND OF THE INVENTION

The present invention is directed to apparatus and method to measure the characteristics of the motion of objects undergoing substantially periodic motion using image analysis. Though developed to characterize the motions of microelectromechanical systems ("MEMS"), and, in particular, to test MEMS resonators, the present invention can be applied to any oscillating system.

MEMS resonators represent a fundamental type within a class of relatively new technologies developed by micromachining silicon and other materials. MEMS devices are expected to become part of future generations of communication, navigation, and information handling systems because of their simplicity, small size, and low power requirements. Methods of fabricating standard integrated circuits are compatible with making MEMS.

MEMS resonators show special promise as oscillators, filters, and mixers at radio frequencies. They can also function as accelerometers and gyroscopes in location-finding devices. Unlike conventional microelectronic devices, MEMS resonators have moving parts. Thus characterizing their operation requires analyzing images recorded while they operate.

Designing, fabricating, and testing MEMS devices require tools to verify that their dimensions, motions, and electrical signals substantially meet the designer's intent. Tools that accomplish these tasks automatically at the wafer level are especially desirable.

Tools that characterize electrical behavior are readily available from VLSI technology. The challenge is to combine both electrical and optical testing to simultaneously examine the motions that are the distinguishing characteristic of MEMS (and other periodic) devices. Further, a MEMS resonator may or may not have sensing means built in to enable electrical measurements that characterize the operation of the DUT. Even if a MEMS resonator has such means, the electrical measurement may require sophisticated equipment or circuits. Optical measurements are therefore preferred.

The most common optical measurements of DUT motion in the prior art require manually controlled test equipment, measuring the magnitude of DUT motion from visual observations under a microscope. There have been reports of more sophisticated techniques: measurements with a laser vibrometer or analysis of a series of time-resolved images produced by strobed illumination. But these techniques have limitations. Laser vibrometry is a spot method applicable mostly to measurements in the Z-plane (that is, perpendicular to the DUT's surface). Stroboscopy, and a derivative that combines interferometry with a strobed illumination source, measure motions in three dimensions using registration algorithms with six degrees of freedom. However, these stroboscopic techniques are limited to DUT motions that fall below an upper frequency limit set by how fast the source of illumination can be strobed, i.e., turned on and off.

Thus there exists a need for apparatus and methods of measuring DUT motions that is precise, sophisticated, and not subject to the limitations of the prior art.

SUMMARY OF THE INVENTION

The present invention makes measurements in the X-Y plane (i.e., the plane of the DUT surface). Measurement can be extended to the third dimension with interferometry. The upper limit on the frequency of DUT motions analyzed by the present invention is limited only by the device that provides the stimulus or by the DUT itself. Because the present invention uses standard video images, recorded while the DUT is illuminated continuously, the technique imposes no frequency limits. The present invention is also significantly faster and less expensive to implement than the prior art. There is no known commercially available test equipment with the capabilities of the present invention, and MEMS resonators currently in production have motional frequencies above the limit of the testing techniques of the prior art.

The primary advantage of the present invention is that it quickly characterizes devices that have very high motional frequencies, e.g., on the order of megahertz. Motion estimates are derived from standard video images analyzed with a novel blur synthesismatching algorithm, rather than from images made with strobed illumination and analyzed with sophisticated image-registration algorithms.

The present invention uses inexpensive equipment that is commercially available. For example, it uses continuous (rather than strobed) illumination. It does not require an expensive laser vibrometer ($85,000) or an external spectrum analyzer ($25,000), because the analysis is performed in software. And the present invention uses an inexpensive video camera based on a charge-coupled device ("CCD") ($300) instead of a high-resolution digital camera ($15,000).

Still another new feature is that the present invention offers a self-contained test that provides for DUT stimulus and electrical and optical measurements, together with on-line data analysis and reporting during testing.

Therefore one object of the present invention is to provide apparatus and method for measuring DUT motions of objects in periodic motion (such as MEMS resonators) that overcomes the drawbacks of the prior art.

Another object of the present invention is to provide apparatus and method for measuring DUT motions of objects such as MEMS resonators that have no frequency limitations.

Briefly stated, the present invention provides apparatus and method to measure the characteristics of the substantially periodic motion of a mechanical system. A nonintrusive technique measures such motion by analysing images of a movable component of the system without requiring a motion sensor built into the system. If the system includes a motion sensor, the present invention can calibrate it. The present invention applies to an object of any length scale if it can be imaged. The displacement of a component is obtained from a single, time-exposed image while the system is in periodic motion and a reference image made with the component at rest. The technique, implemented as one component of an automated test-bed apparatus, is significantly faster than the prior art. The present invention is especially efficient in characterizing the mechanical performance of MEMS. Speed facilitates both hands-on testing of prototypes and testing in production environments. Results from the present invention applied to a microfabricated resonator are compared with electrical measurements derived from an integrated comb-drive. Benchmark comparisons demonstrate that the present invention delivers comparable results in shorter times with simpler, less expensive apparatus than the prior art. The present invention removes any upper limit on the frequency of motions that can be analyzed.

According to an embodiment of the invention, apparatus to measure parameters of a substantially periodic motion of an object, comprises: a device to capture a first image of the object at rest and at least one second image of the object in motion; a digitizer to digitize the first and the at least one second images; a computer to synthesize from the digitized first image a series of artificial images of the object in motion; and an analyzer to compare the series to the at least one digitized second image, thereby measuring the amplitude.

According to a feature of the invention, a method of measuring parameters of a substantially periodic motion of an object, comprises the steps of: illuminating the object at rest and in motion; capturing a first image of the object at rest and at least one second image of the object in motion when the object is illuminated; digitizing the first and the at least one second images; synthesizing from the digitized first image a series of artificial images of the object in motion; and comparing the series to the at least one digitized second image, thereby measuring the amplitude.

According to another feature of the invention, apparatus to measure parameters of a substantially periodic motion of an object, comprises: means for illuminating the object at rest and in motion; means for capturing a first image of the object at rest and at least one second image of the object in motion when the object is illuminated; means for digitizing the first and the at least one second images; means for synthesizing from the digitized first image a series of artificial images of the object in motion; and means for comparing the series to the at least one digitized second image, thereby measuring the amplitude.

These and many other objects and advantages of the present invention will be readily apparent to one skilled in the pertinent art from the following detailed description of a preferred embodiment of the invention and the related drawings, in which like reference numerals designate the same elements.

BRIEF DESCRIPTION OF THE DRAWINGS

FIGS. 4(h) and 4(i) also show the best-fit brightness profiles synthesized from the rest image profile in FIG. 4(g).

DESCRIPTION OF THE PREFERRED EMBODIMENT

The following description uses MEMS resonators to illustrate the principles of the invention, but the DUT could equally well be any oscillating system. All that is required is that one capture an image of it both in periodic motion and at rest.

Figure 1:
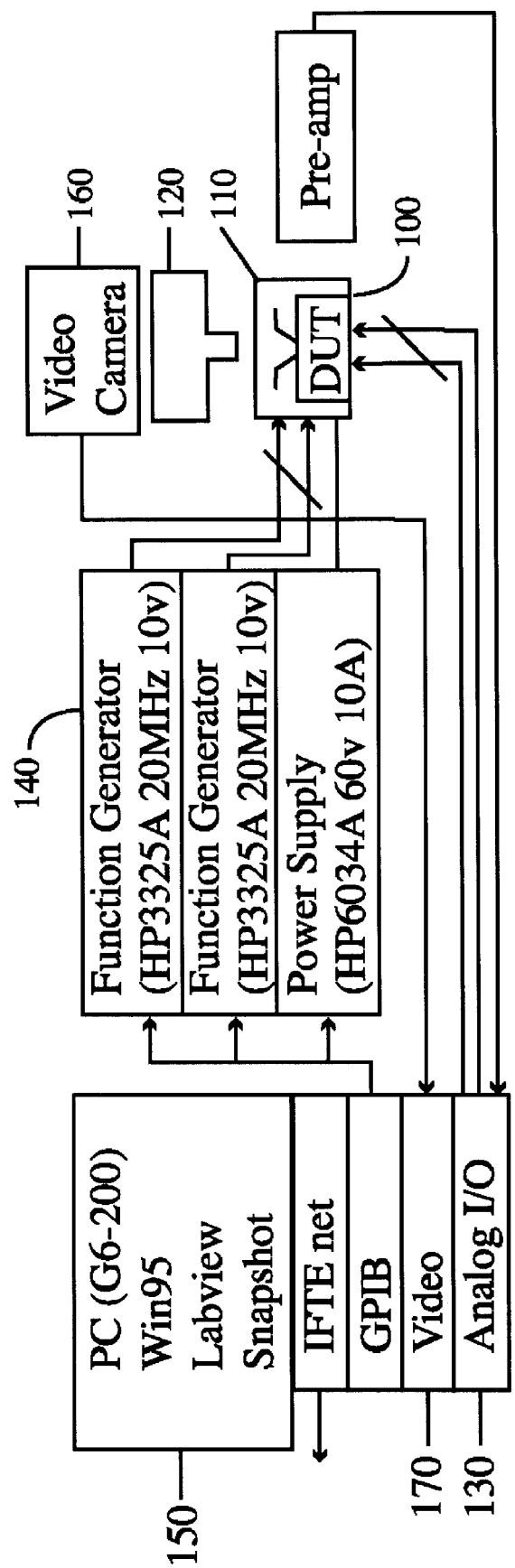
FIG. 1 is a block diagram of the components of the present invention showing their interaction.

Referring to FIG. 1, a DUT 100 rests on the stage of a micromanipulator dieprobe station 110, such as an Alessi Rel-4100, equipped with a microscope 120, such as a Mitutoyo FS-60, that has long focal length objectives. At the highest magnification available, 1000×, the working distance is about 18 mm. This setting uses a 50× objective with a numerical aperture of 0.42, with 2× zoom and 10× magnification provided by the optical tube arrangement. Microprobes allow for making electrical contact to the drive and signal electrodes of DUT 100.

LabView® software manipulates voltages and output signals through a standard internal plug-in card 130 of any variety or external GPIB instruments 140. The software runs on a personal computer ("PC") 150 with at least 64 Mbytes of RAM and a central processor that runs at at least 200 MHz. Other models and types of test equipment could be used in the present invention.

Also under LabView® software control is a video camera 160 and a frame grabber 170 to record micrographic images. We have successfully used several different types of camera and video capture means, e.g., a ViCam device with Twain software drivers.

In LabView® parlance, the entire software/hardware system is a Virtual Instrument ("VI"). We have programmed several test modes, including a free run mode to investigate biasing conditions, and a resonance curve test sequence. This test-bed uses software signal processing, and does not require an external hardware spectrum analyzer.

Figure 2:
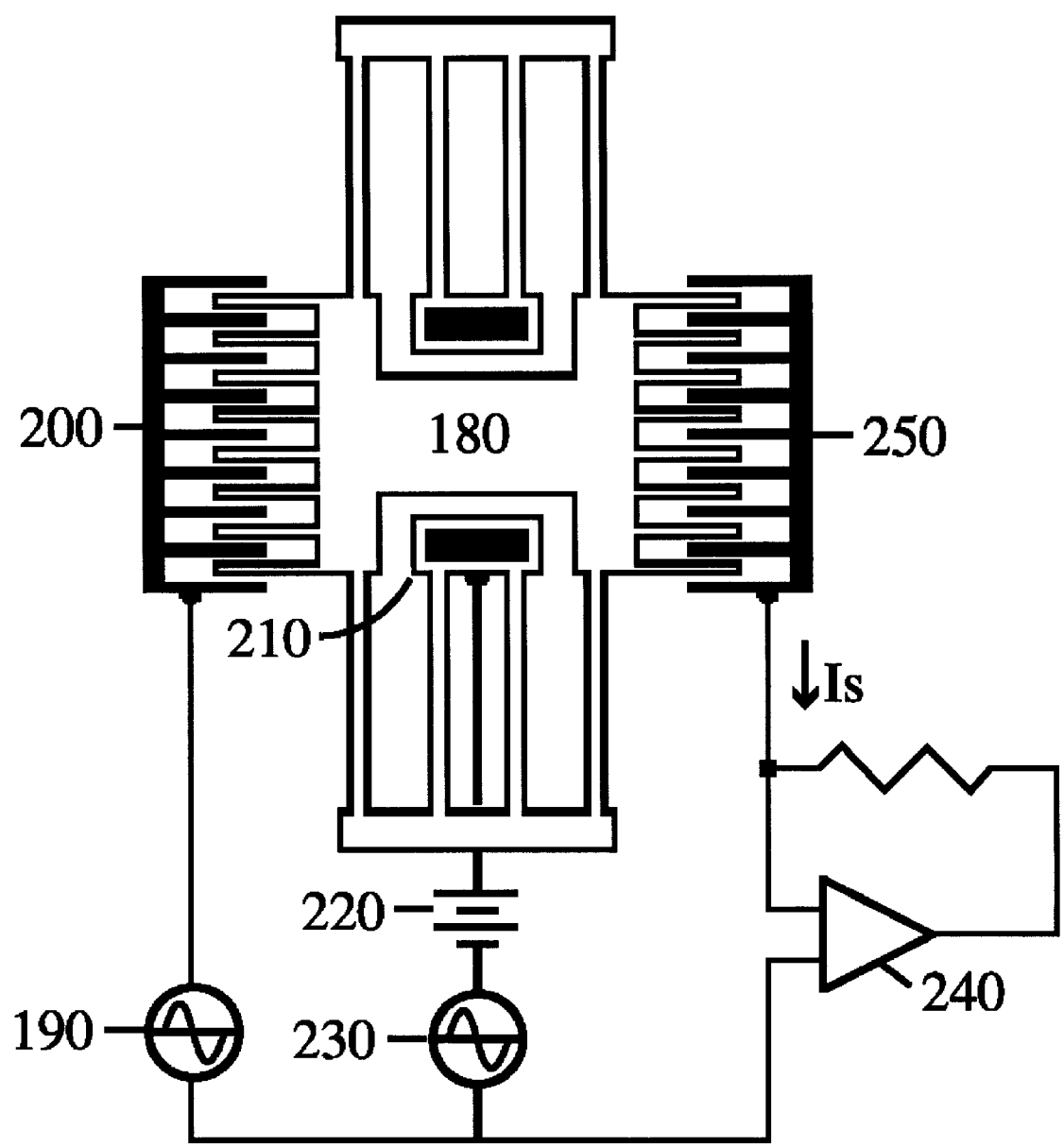
FIG. 2 shows a biasing circuit for testing resonators in the apparatus of the present invention.

FIG. 2 shows the biasing circuit for testing MEMS resonators. A sinusoidal voltage (Vdac) 190 imposed across a drive comb 200 on one side of the device drives a resonator DUT 180. A substrate/shuttle/plate terminal 210 is driven with a high dc voltage (Vpdc ~50 V) 220 that is in series with another sinusoidal voltage (Vpac) 230. A pre-amplifier 240 converts an output current (Is) from a DUT output comb 250 to a voltage. We have used an EG&G PAR Model 5182 pre-amplifier. All wiring between DUT 180 and the external driving sources and to pre-amplifier 240 is coaxial cable. Typical signals at the output of pre-amplifier 240 are less than one volt.

We have programmed several test modes to test resonator characterization. A 'free run' mode allows hands-on control with observations and measurements in real time. This 'free run' mode is especially useful for set up and adjustment of bias parameters.

A resonance-curve measurement mode determines both optical and electrical resonance frequency, $f_0$, and quality factor, Q. In this test we set up the Vpac voltage and frequency, the Vpdc voltage, and the Vdac voltage. Then we step the Vdac frequency across a range that includes the resonant frequency. We measure the electrical and mechanical response of the resonator at each frequency step. Finally, $f_0$ and Q are extracted by curve fitting the response vs. frequency points.

Figure 3:
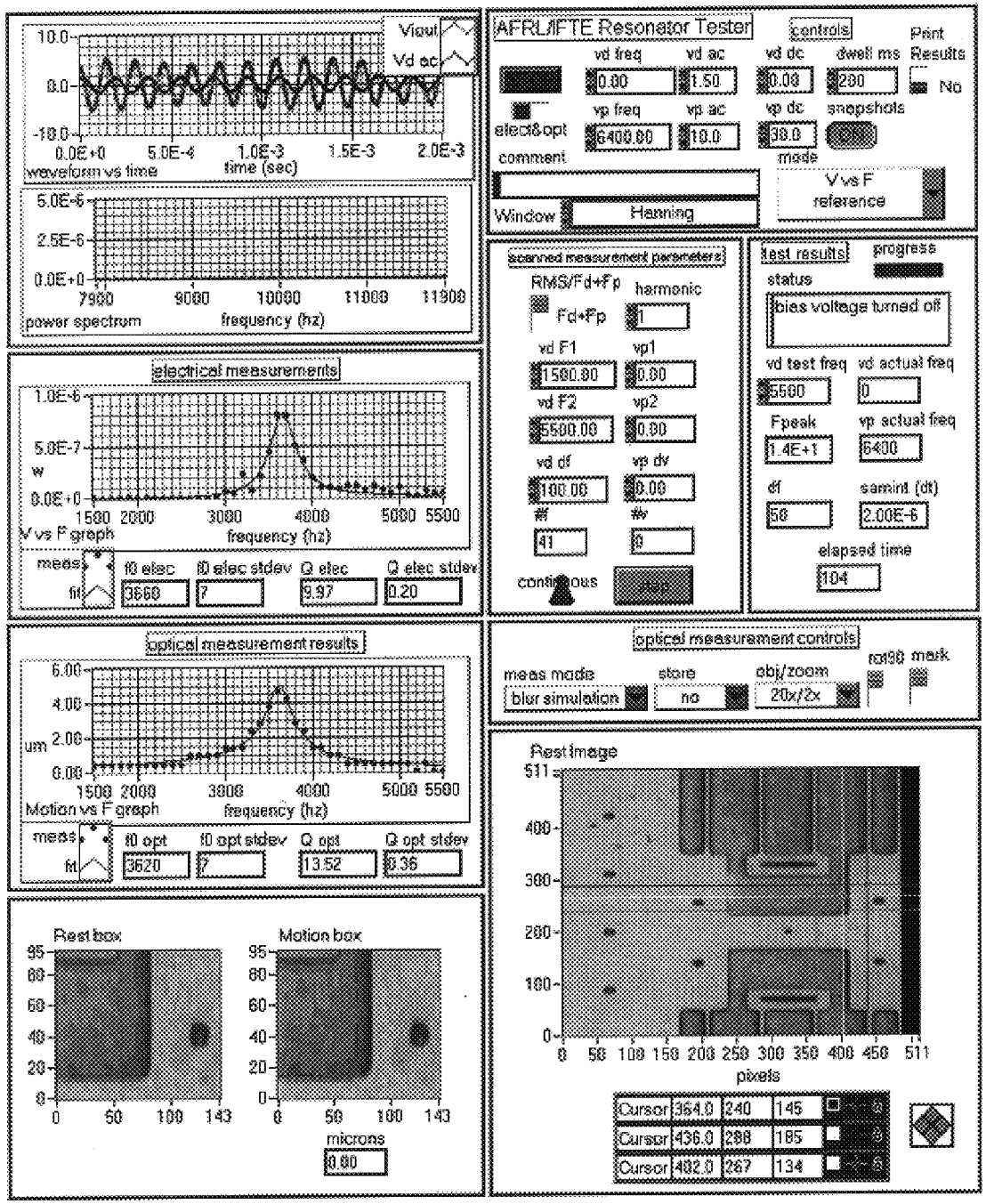
FIG. 3 shows a virtual 'front panel' display from a resonator test performed by the apparatus of the present invention.

FIG. 3 shows the VI display after optical and electrical resonance curve measurements have been made on a MEMS resonator. Other test modes allow for scanning one parameter across a range while holding the others constant. This basic VI is callable from upper level VI's, for example, from a VI programmed to automatically characterize motion magnitude, $f_0$, and Q over a two- or three-dimensional bias parameter space.

The section above describes mostly the control of DUT 100. Now we turn to of analysing the image, the technique that is central to the present invention. Some subtleties of controlling DUT 100 are also explained.

Quantitative measurements of the amplitude of the motion of an oscillating structure are obtained directly from two video images: a "rest-image" taken with DUT 100 at rest (no motion) and a blurred "motion image" taken while DUT 100 is driven sinusoidally. Exposure times for the motion-image are large (typically 30 ms) compared with the period of the stimulation (typically<1 ms). The idea is to estimate the amplitude of the motion from the blur.

We estimate amplitudes by synthesizing from the rest-image a reference set of candidate blurred motion-images that correspond to sinusoidal motions with different amplitudes. The synthesized images are then compared to each measured motion-image to determine the best matches. We normally estimate motion amplitudes from the brightnesses of a single row of pixels in a line parallel to the direction of motion within the region of interest. Alternatively, the estimates from several such rows can be averaged.

The estimated brightness, $S_i$ of the $i^{th}$ synthetic image pixel is conveniently described as a weighted sum, $$S_i = \sum_{j=-N+1}^{N-1} w_j(N) \cdot R_{i+j}$$

of the brightnesses, $R_{i+j}$, of rest-image pixels. Here j is the offset of the rest-image pixel being weighted and summed from the motion-image pixel being synthesized. j must span an offset range that, at a minimum, encompasses twice the number of pixels expected as the amplitude estimate, plus one pixel. The weighting function $w_j(N)$ is $$w_j(N) = \frac{1}{\pi}\left[\arcsin\left(\frac{j+\frac{1}{2}}{N-\frac{1}{2}}\right) - \arcsin\left(\frac{j-\frac{1}{2}}{N-\frac{1}{2}}\right)\right].$$

The trial motion amplitude, A (measured in pixels) is related to N by A=N-1. For example, the special case of N=1 corresponds to the assumption of no motion. For this case, the summation has a single term, $S_i = w_0(1) R_{i+0} = R$, and the synthesized motion pixel is simply the rest-image pixel at the same image location.

In general, a pixel in the CCD that images a blurred motion-image effectively records the light from a stripe of several rest pixels. This stripe can be thought of as glued to the device and repeatedly 'moving beneath' the CCD pixel's field of view. The length of the stripe and the corresponding number of pixels it spans depend on the amplitude of the motion. Segments at each end of the stripe come to rest in the pixel's view, as the shuttle stops and reverses direction, and so spend more time there (thus contributing more light to the blurred pixel). Segments closer to the center of the stripe spend less time in the CCD pixel field of view, and hence the corresponding pixels have lower weight. The weighting function expresses the time fraction of a motion cycle that each pixel-sized segment of the stripe along the moving device spends below the CCD's field of view for the pixel being synthesized, assuming that the motion is sinusoidal.

Blur synthesis works only when there is adequate contrast; no blurring results from the motion of a featureless structure. The ideal situation is for the structure to be marked by an abrupt change from bright to dark, for example, a high contrast vertical edge, light on the left and dark on the right, which blurs with horizontal motion. The brightness profile of line of pixels running left to right across the region of interest is then a step function, $$R_i=1 \ (i<0); \ R_i=0 \ (i>0),$$

and that of a blurred motion-image due to a sinusoidal oscillation of amplitude, A, is described by $$B_i = 1 \ (i \leq -A);$$
$$B_i = 0.5 - \frac{1}{\pi} \cdot \arcsin(i/A) \ (-A < i < A);$$
$$B_i = 0 \ (i \geq A).$$

In practice, the contrast between a movable structure and the substrate above which it moves offers an approximation that adequately represents the ideal situation described above. The only assumption necessary is that the portion of the substrate hidden by the overlying movable structure has the same average brightness as the portion near it that is visible. One can then use the portion of an image near the edge of the movable structure for the analysis of the motion.

Figure 4:
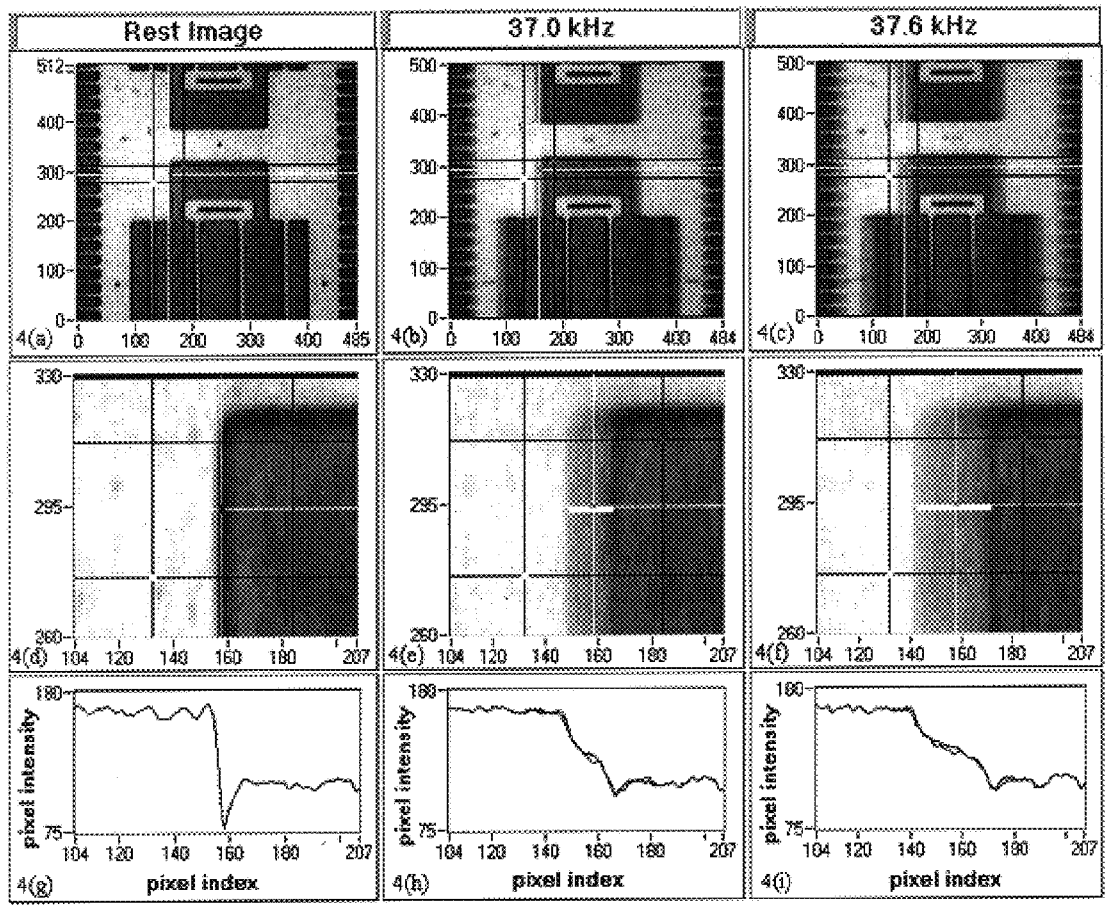
FIG. 4(a) shows an image of a MEMS resonator at rest.
FIG. 4(b) shows an image of a MEMS resonator driven near resonance.
FIG. 4(c) shows an image of a MEMS resonator driven at resonance. Cursors in FIGS. 4(a)–4(c) are positioned to select regions for analysis.
FIGS. 4(d), 4(e), and 4(f) show enlargements of selected regions from FIGS. 4(a), 4(b), and 4(c).
FIGS. 4(g), 4(h), and 4(i) show the measured brightness profiles for the portions of line 294 of FIGS. 4(d), 4(e), and 4(f).

This technique is illustrated in FIGS. 4(*a*)–4(*i*). The degree to which this synthesis replicates the blurred portion of a measured image may be inferred from FIGS. 4(*h*) and (*i*), which show both measured and synthesized intensity profiles.

Figure 5:
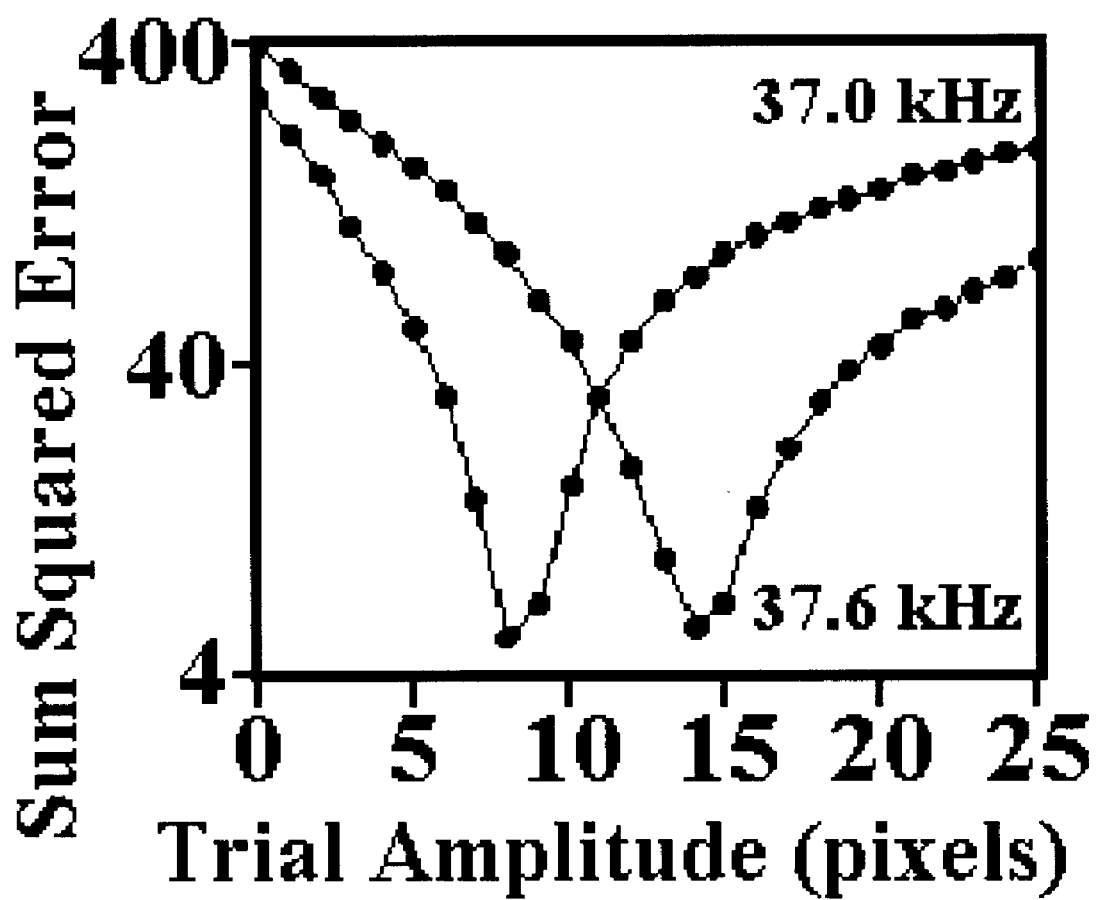
FIG. 5 shows the least-squared-error data for selecting motion amplitudes in FIGS. 4(a)–4(i). The sums of the squares of the differences of a line of measured and synthesized motion-image pixel intensities are plotted against assumed motion amplitudes.

The selectivity of the blur simulation for identifying the best motion amplitude depends on how quickly the synthesized profile departs from the measured profile as one varies the trial amplitude in the vicinity of the true motion amplitude. FIG. 5 shows plots of the squared difference of measured and synthesized pixel intensity versus trial amplitude for the two motion-images in FIGS. 4(*a*)–4(*f*). There is little ambiguity about the number of pixels that best represents the motion amplitude (8 pixels at 37.0 kHz shown in FIGS. 4(*b*) and 4(*e*), 14 pixels at 37.6 kHz shown in FIGS. 4(*c*) and 4(*f*)). In fact, results like those in FIG. 5 suggest that one might be able to estimate motion amplitudes with sub-pixel resolution. A simple scheme for obtaining the motion amplitude with sub-pixel resolution is to interpolate to find a better minimum for curves like those in FIG. 5.

Another way to estimate sub-pixel resolution motion is to synthesize additional line profiles with trial amplitudes at intervals of less than one pixel. We did this with the same time-weighted summation described above, except we replaced the rest-image pixel intensity, R, by an appropriately weighted sum of the intensities of multiple adjacent restimage sub-pixels. These 'synthetic' rest-image sub-pixels can be derived as simple spatial area fractions of the original rest-image pixels. The spatial area fraction depends on the number of sub-pixels assigned to a pixel. As before, the temporal weighting of these derived sub-pixels depends on the time a pixel spends 'moving beneath' the CCD's actual sized sampling pixel field of view.

Even though the rest image is analyzed in sub-pixels and could yield a sub-pixel resolution synthesized motion-image, the synthesis algorithm is structured to produce a coarser, pixel-level image. We do this to compare the synthesized image with the pixel-level motion-image measured by the imaging CCD. We found it possible in this way to reproduce motion amplitude estimates to within±0.2 pixels, which corresponds to about 50 nanometers at 400× magnification with our setup. To improve useful resolution further would require closer attention to maintaining the registration of the rest- and motion-images during a test sequence over several frequencies.

Aside from mounting microscope 120 on an air table, no precautions were taken to optimize registration. Finally, locating the minimum-square-error point in the curve might be speeded greatly by testing at fewer frequencies, curve fitting, and calculating the minimum point.

Motion amplitudes determined for a sequence of drive frequencies are extracted in this way from image data and plotted against frequency to produce resonance curves as shown in the plot in FIG. 3 labeled "optical measurement results".

The one-sided amplitude estimates in pixels are converted to peak-to-peak micrometers by imaging one (1) and ten (10) micrometer standard reticules oriented parallel to the camera's vertical and horizontal directions. To date we have tested mostly designs with relatively large motion amplitudes, at low frequencies and large drive voltages, in air. However, sub-pixel motion estimates are equally useful for testing designs with relatively small motion amplitudes, at high frequencies and low drive voltages, in vacuum.

Motion caused by imposing Vdac across drive comb 200 results in variations in the current, $I_S$, in DUT output comb 250 because of changes in the latter's capacitance. The electrical signal of interest here is the portion of the current from DUT output comb 250 that comes from the motional component of its capacitance. The output current is small, and parasitic capacitance, associated with DUT 100 and the test setup, couples current noise from the Vdac source to the node of DUT output comb 250, at the same frequency as the shuttle motion and motional current component. Therefore Vpac is used as a carrier frequency signal to modulate the signal from DUT output comb 250, as suggested by Nguyen (See, e.g., William C. Tang, Tu-Cuong H. Nguyen, Michael W. Judy and Roger T. Howe, "Electrostatic-comb Drive of Lateral Polysilicon Resonators", William S. Trimmer, ed., *Micromechanics and MEMS* (New York: IEEE Press, 1997), pp. 194–197).

The output signal harmonic at the sum frequency is proportional to $I_S$ and can be selected in the frequency domain from the power spectrum. Vpac affects motion in this carrier modulation scheme to some degree. If not chosen carefully, it can become a source of error when comparing electrical and optical measurements and when extracting parameters from optical measurements. In addition to modulating the current from DUT output comb 250, Vpac affects the potential across input drive comb 200, providing an additional drive force. If the Vpac frequency or the Vdac and Vpac sum or difference frequencies are too close to the resonance peak frequency, the additional force will change the motion amplitude and distort the resonance curve. If the Vpac frequency is chosen to be well above or below the resonance peak, the effect is smaller. The magnitude of the effect can be seen in FIG. 6, which shows optically measured resonance curves measured with and without Vpac applied, at different Vdac frequencies. The low-frequency, low-motion magnitude portion of the resonance curve plot is shown, using curves extrapolated from curve fitting measurements done near the resonance peak. During all of the measurements Vdac magnitude and Vpdc were held constant, the resonance peak was at about 37,600 kHz, and Q was about 60.

Figure 6:
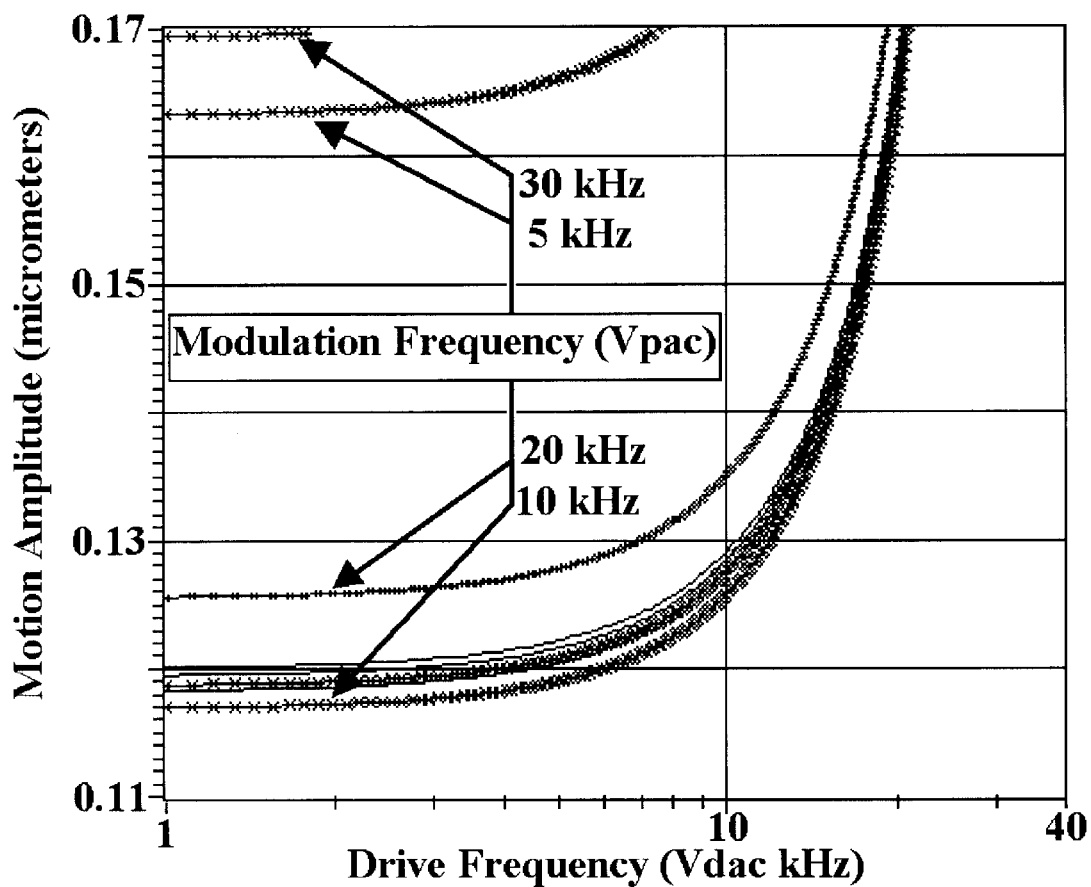
FIG. 6 shows resonance curves fitted to optical data and extrapolated to low frequencies to show the effect of the modulation voltage, Vpac.

The curves in FIG. 6 show that the y-axis intercept is elevated for choices of Vpac frequency that introduce drive harmonics near the resonance peak. This introduction could lead to errors in calculating the drive force parameter, which is related to this intercept.

Problems of this sort can be avoided by choosing Vpac drive frequencies well away from the resonance peak, but this choice does place competing demands on the transconductance performance of pre-amplifier 240. We can also remove Vpac during the optical measurement. The electrical measurement consists of: capturing about 20 ms of the output voltage waveform from pre-amplifier 240 (sampling at up to 1.0 MHz); negating every other sample (to produce Nyquist shift in the frequency spectrum); calculating the power spectrum of the waveform; and extracting the magnitude of the component at the sum frequency. The magnitude of the extracted sum frequency is plotted against the drive frequency, producing the resonance curve labeled "electrical measurements" as displayed in FIG. 3.

It is important to choose the frequency of Vpac so that harmonics are not introduced in the frequency range between the frequency of Vdac and the sum frequency. For example, if Vdac is scanned across a range of 10 kHz to 20 kHz, using a Vpac frequency of 6 kHz may be far enough away from the peak to avoid excessive drive effects due to Vpac's effect on the voltage of input drive comb 200. But even a very small second harmonic in the Vpac source (at 12 kHz) may show up as a noise spike in the power spectrum of the electrical measurement, because of direct coupling of the Vpac signal through parasitic capacitance associated with test setup for DUT 100. In this case a better choice might be 3 kHz, since the second harmonic is outside the scanned range and a third harmonic in the Vpac supply is likely to be smaller, or 30 kHz, since fractional harmonics in Vpac such as 15 kHz or 10 kHz are also probably smaller. Similarly, unwanted harmonics from the Vdac source may also show up as false spikes, moving through the power spectrum of the signal from DUT output comb 250, because of coupling through parasitics from the input node to the output node. These false spikes can be avoided by using signal sources with good spectral purity.

The resonance frequency, $f_0$, and the quality factor, Q, are obtained within our test application by non-linear least squares fits of the optical and electrical data to appropriate resonance functions. Since the electrical data were obtained from a power spectral density analysis, they were fitted to a power resonance function of the form $$P(f)=A\ f^2/[B^2f^2+(f_0^2-f^2)^2]. \qquad (1)$$

The vibration amplitudes obtained from the optical data were fitted to a displacement resonance function of the form $$X(f)=A/[B^2f^2+(f_0^2-f^2)^2]^{1/2}. \qquad (2)$$

In both cases A, B, and $f_0$ are the fitting parameters, and $Q=f_0/B$.

The fitting scheme consists of these steps, as described for the displacement resonance. First, values of $f_0$ and $X(f_0)$ are estimated by fitting a parabola to the highest point of the amplitude vs. frequency data and to the points at the next lower and next higher frequencies. This also fixes an estimate of the ratio A/B. The function is then forced through the point at the lowest frequency sampled to provide independent first estimates of all three parameters, A, B, and $f_0$. These values are then refined by repeatedly sampling (B, $f_0$)-space randomly in the neighborhood of their current best estimates. For each (B, $f_0$) pair, the parameter A is then found from a least-squares fit to the data, since the resonance functions are linear in A. This procedure converges well for any data containing a well-defined peak and is terminated by time (usually 1 second). Uncertainties of Q and $f_0$ are determined using standard methods for fitting non-linear functions (See, e.g., Philip R. Bevington, *Data Reduction and Error Analysis for the Physical Sciences* (New York, McGraw-Hill Book Company, 1969), ch. 11–5, ). Examples of fits to both electrical and optical data made in this way are shown in FIG. 3.

ADDITIONAL EMBODIMENTS OF THE INVENTION

In a second embodiment of the present invention, we have tested in a vacuum. A packaged DUT 100 is placed in a small vacuum chamber fitted with a transparent top surface (e.g., glass). DUT 100 is imaged through the transparent top with long-working-distance microscope objectives. Such a test is desirable because MEMS resonators may be used in a vacuum where quality factors may be three orders of magnitude greater than in air.

In another embodiment, one analyzes DUTs with different motion types, e.g., rotational or non-linear motions, or motions involving more than one frequency. The principal embodiment above assumes a pure sine wave motion. But it could just as well assume a different motion from which to calculate the set of candidate motion images that are matched against the measured motion.

The principal embodiment above uses only the pixels in the image of DUT 100 that fall on a small line segment in a chosen area of the image to perform matching and motion magnitude estimation. We could just as well use more pixels, such as a whole line, many lines, all lines, or some other set of pixels. In general, using more pixels would mean more time for the analysis but potentially higher accuracy.

In still another embodiment, interferometry can perform measurements in the Z direction, perpendicular to the surface of DUT 100, similar to such measurements reported in the prior art.

In a further embodiment, the present invention employs strobed illumination. We extend the upper frequency limit of the prior art by applying blur synthesis matching to the (slightly blurred) images that result from a strobed illumination source at the lower limit of its pulse width. We have produced a set of blurred images from a set of stroboscopic images recorded on a different measurement system that used strobed illumination, averaged the many images taken at each frequency, and analyzed them with our blur-synthesis-matching algorithm. The results were in good agreement with the prior-art analysis of the strobed images.

In still another embodiment, we test DUTs in wafer form, or while the DUTs arc handled with automatic wafer probing equipment.

In yet another embodiment, the apparatus of the present invention is operated by a remote user via the Internet.

Clearly many modifications and variations of the present invention are possible in light of the above teachings. It should therefore be understood that, within the scope of the inventive concept, the invention may be practiced otherwise than as specifically claimed.

What is claimed is:

1. Apparatus to measure parameters of a substantially periodic motion of an object, which comprises:

a device to capture a first image of said object at rest and at least one second image of said object in motion;

a digitizer to digitize said first and said at least one second images;

a computer to synthesize from said digitized first image a series of artificial images of said object in motion; and an analyzer to compare said series to said at least one digitized second image, thereby measuring said parameters of said substantially periodic motion.

2. Apparatus as in claim 1, wherein said object is a microelectromechanical system.

3. Apparatus as in claim 2, wherein said microelectromechanical system is a one of a resonator and a filter.

4. Apparatus as in claim 2, wherein said object is comprised of a plurality of resonators coupled to each other.

5. Apparatus as in claim 2, wherein said microelectromechanical system is comprised of a plurality of resonators coupled to each other.

6. Apparatus as in claim 1, wherein said object is a one of a resonator and a filter.

7. Apparatus as in claim 1, wherein said device to capture is a one of a video and a still camera.

8. Apparatus as in claim 1, further including a controller that determines said parameters.

9. A method of measuring parameters of a substantially periodic motion of an object, which comprises the steps of:

capturing a first image of said object at rest and at least one second image of said object in motion;

digitizing said first and said at least one second images;

synthesizing from said digitized first image a series of artificial images of said object in motion; and comparing said series to said at least one digitized second image, thereby measuring said parameters of said substantially periodic motion.

10. The method of claim 9, wherein said step of synthesizing includes a further step of selecting at least one set of pixels from said digitized first image.

11. The method of claim 10, wherein said step of selecting includes choosing said at least one set of pixels to be in a line.

12. The method of claim 10, wherein said step of selecting includes choosing said at least one set of pixels to be rectangular.

13. The method of claim 10, wherein said step of selecting includes choosing said at least one set of pixels to be non-contiguous.

14. The method of claim 11, wherein said step of selecting includes choosing said at least one set of pixels to be in a line that is parallel to the direction of motion of said object.

15. The method of claim 9, wherein said step of synthesizing includes a further step of calculating each member of said series of artificial images from at least one unique member of a series of motion parameters.

16. The method of claim 9, wherein said step of comparing further includes:

calculating a least-square difference between each of said artificial images and said at least one second image; and choosing a smallest least-square difference.

17. The method of claim 9, wherein said steps of capturing, measuring, synthesizing, and comparing are repeated at a plurality of frequencies of said substantially periodic motion, whereby a set of parameters is obtained from which a series of properties of said object may be extracted.

18. Apparatus to measure parameters of a substantially periodic motion of an object, which comprises:

means for capturing a first image of said object at rest and at least one second image of said object in motion;

means for digitizing said first and said at least one second images;

means for synthesizing from said digitized first image a series of artificial images of said object in motion; and means for comparing said series to said at least one digitized second image, thereby measuring said parameters.

19. Apparatus as in claim 18, wherein said object is a microelectromechanical system.

20. Apparatus as in claim 19, wherein said microelectromechanical system is a one of a resonator and a filter.

21. Apparatus as in claim 19, wherein said object is comprised of a plurality of resonators coupled to each other.

22. Apparatus as in claim 19, wherein said microelectromechanical system is comprised of a plurality of resonators coupled to each other.

23. Apparatus as in claim 18, wherein said object is a one of a resonator and a filter.

24. Apparatus as in claim 18, wherein said means for capturing is a one of a video and a still camera.

25. Apparatus as in claim 18, further including a controller that determines said parameters of said substantially periodic motion.

* * * * *